M. WOOLF.
OPTICAL INSTRUMENT.
APPLICATION FILED NOV. 23, 1916.

1,240,289.

Patented Sept. 18, 1917.
2 SHEETS—SHEET 1.

INVENTOR
Michael Woolf
BY
ATTORNEY

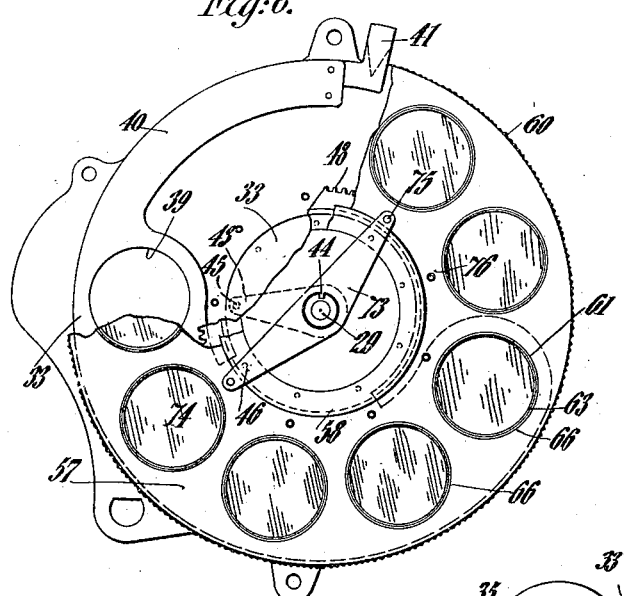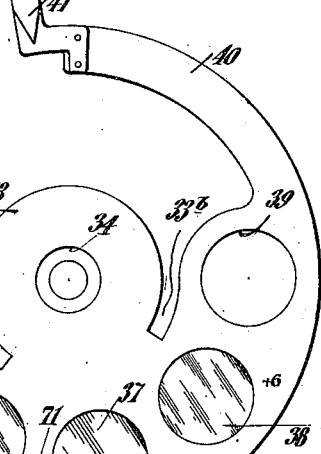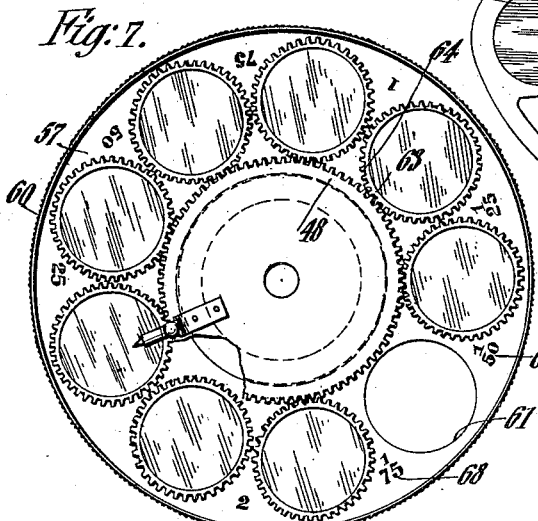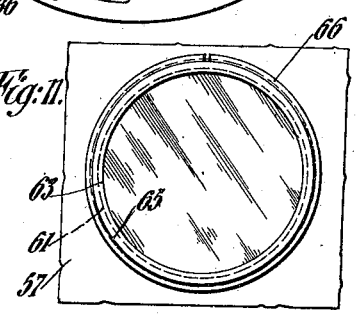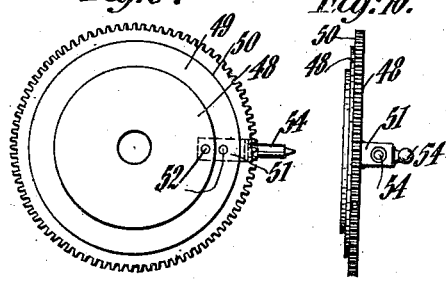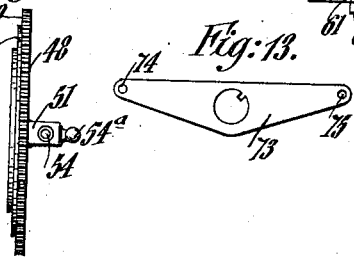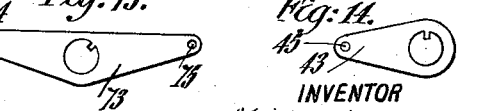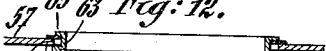

UNITED STATES PATENT OFFICE.

MICHAEL WOOLF, OF NEW YORK, N. Y.

OPTICAL INSTRUMENT.

1,240,289. Specification of Letters Patent. Patented Sept. 18, 1917.

Application filed November 23, 1916. Serial No. 132,971.

*To all whom it may concern:*

Be it known that I, MICHAEL WOOLF, a citizen of the United States, and resident of the borough of Manhattan, in the city and State of New York, have invented certain new and useful Improvements in Optical Instruments, of which the following is a specification.

The present invention relates to improvements in optical instruments, particularly for use in adapting cylindrical lenses to different refractive errors of astigmatism of the eye, and the like.

An object of the invention is to provide an improved instrument of this character, in which a plurality of lenses of different strength are provided, adapted to be successively brought before the eye, the lenses being of such variety, either singly or by combination as to afford a testing range covering practically any degree of astigmatism. A further object is to provide means for simultaneously and accurately setting all of the axes of the cylindrical lenses for the proper degree of refraction which is first determined by the usual method, so that, regardless of the increasing or decreasing power of the lenses, the axes will always be the same as each lens is brought before the eye.

It is also an object to provide in combination with the present improvements, a spherical lens system for testing the refractive errors of the eye, for hypermetropia or myopia, or other lenses in connection with prismatic lenses or other means for determining muscular imbalance or strabismus.

With these and other objects in view, my invention is shown in the accompanying drawings, and will be hereinafter more fully described with reference thereto, and finally pointed out in the claims.

In the accompanying drawings,

Figure 1 is a front view of my improved device, showing the same mounted in duplicate, one for each eye, Fig. 2 is a rear view with parts broken away, Fig. 3 is a side view thereof, Fig. 4 is a vertical sectional view along the line 4—4 of Fig. 2, Fig. 5 is a horizontal sectional view along the line 5—5 of Fig. 2, Fig. 6 is an elevation from the rear, with the cover plate removed, and parts broken away, Fig. 7 is a view of the under side of the main battery of lenses, Fig. 8 is a front view of the auxiliary supplementary battery of lenses.

Figs. 9 and 10 are front and edge views respectively of the gear for revolving the lenses, Fig. 11 is an enlarged top view of one of the lenses.

Fig. 12 is a sectional view thereof, and

Figs. 13 and 14 are detail views of the lenses positioning springs employed.

Similar reference characters indicate corresponding parts throughout the several figures of the drawings.

Figure 1:
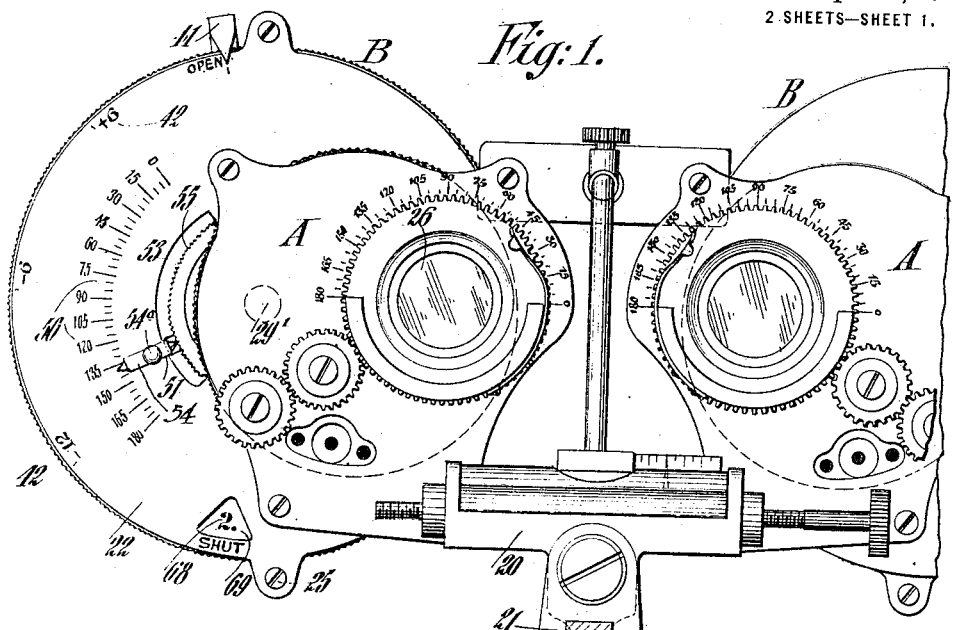
Figures 2, 3, 4:
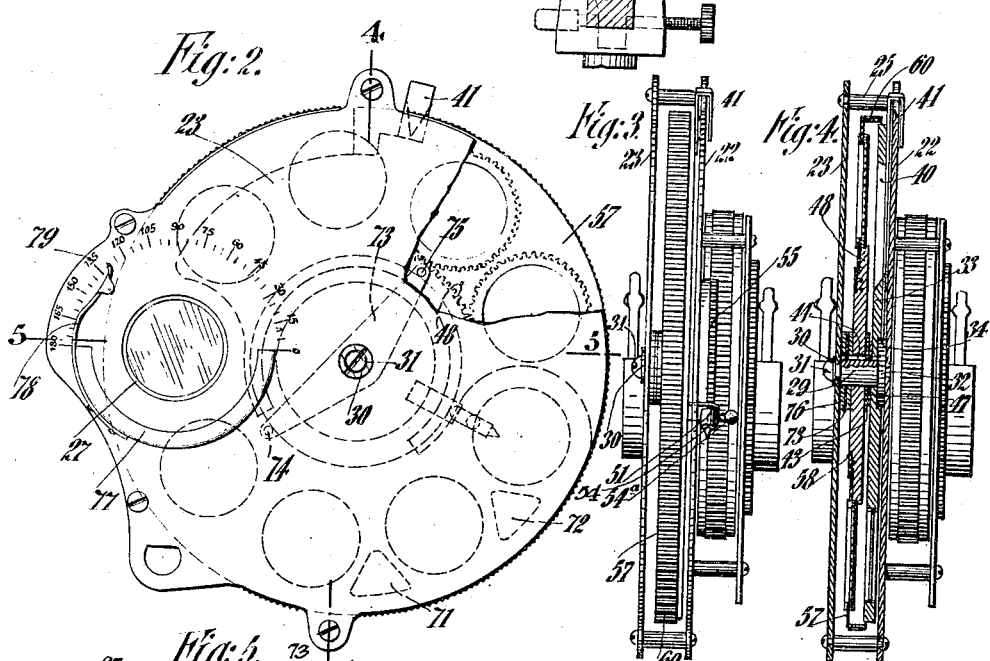
Figure 5:
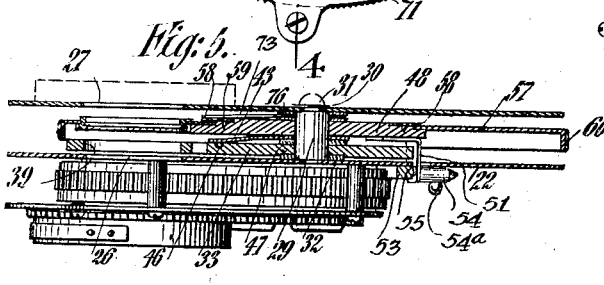

Referring to the drawings, and more particularly to Fig. 1 thereof, a support 20 is detachably connected with a bar or refraction rule 21 upon which is slidably mounted a support (not shown) for holding a small card or chart of the usual test type. At either side of the support 20, there are mounted the test apparatus, in such position as to accommodate the eyes of the patient, the apparatus for each eye being of similar construction, but reversed in operation and position.

The spherical lens system A, which in the preferred construction embodies the principle of the Shigon Patent No. 979,578, of December 27th, 1910, is superimposed upon the cylindrical lens system B, constituting the present improvements. The back plate of the spherical lens system forms the front plate 22 of the system B. The spherical lens system A may be substituted by other systems if desired, or dispensed with.

The front and rear plates 22 and 23 are substantially circular in form, being provided with projecting portions for the spacing posts 25, and at the inner and lower sides shaped to conform to the shape of the system A to permit of its being properly supported, and to provide a contour which fits the face of the patient. The plates 22 and 23 are provided respectively with openings 26 and 27 in line with the openings through the system A.

A shaft 29 is mounted centrally of the plate 22, and the plate 23 is secured thereto by a washer 30 and screw 31. A washer 32 is mounted on the shaft 29 adjacent the plate 22, and a rotatable lens supporting frame 33 is mounted above the said washer, the same being provided with a recess 34 which engages over the said washer so that the frame is spaced slightly from the plate 22 so as to permit its easy movement. This frame is segmental at its outer portion, being five ninths of the circle, and being provided with five divisions, being respectively a blank or closed part 35, a —12.00 diopter lens 36, a —6.00 diopter lens 37, a plus 6 diopter lens 38 and an open space 39 normally in position in alinement with the openings 26, 27. A circumferential extension 40 outside the path of the lenses, is provided at its end with a projecting index 41, which extends from between the plate, and is bent downwardly upon itself, being pointed at the end. Markings 42 corresponding to the divisions of the frame or battery 33, are provided on the marginal portion of the front plate 22, and in such position that when the index is turned to revolve the frame, the markings will indicate the particular lens or division in line with the openings of the plates 22 and 23.

In order to accurately position the lenses, a spring pawl 43 is keyed in a groove 44 of the shaft 29, and is provided with a boss 45, which yieldingly engages recesses 46 in radial alinement with the axes of the lenses or divisions. A washer 47 holds the central portion of the spring raised from the frame 33. The lenses of the frame 33 are used for increasing the range of the spherical lens system A.

Above the plate 43 a gear wheel 48 is rotatably mounted, the same being annularly recessed as at 49 and 50 to form steps. A turning lug 51 is secured to the gear 48 by screws 52, and extends upwardly through a circumferential slot 53 in the plate 22, being provided with a spring pawl 54 having a knob 54ª, the said pawl engaging at the inner side of the slot a toothed circumferential wall or locking member 55, and at the other side being disposed as an index over a graduated refraction scale 56 from 0° to 180°. The frame 33 is circumferentially recessed as at 33ª and 33ᵇ to permit movement of the lug 51, and to permit movement of the frame about the lug.

A circular frame 57 constituting the cylindrical battery, is revolubly mounted on the gear 48 in the recessed portion 50, a retaining ring 58 being disposed in the recess 49 and secured to the gear by screws 59. The outer edge of the frame 57 extends slightly beyond the edges of the plates 22 and 23, and is bent down and milled as at 60, the bent down portion partially embracing the frame 33 of the auxiliary or supplemental battery. This frame 57, it will be obvious, is turned by means of the milled edge, and is divided into nine divisions, each provided with a circular opening 61 therein, eight of these openings being provided with cylindrical lenses of different strength, as follows: 0., .25, .50, .75, 1., 1.25, 1.50, 1.75, 2., the remaining opening being blank, but these may be varied as desired. The lenses are mounted in rotatable frames 63, provided at their lower edge with a toothed flange 64, meshing with the gear wheel 48, and at its upper side with a flange 65, the diameter of which is slightly less than the opening 61 of the frame, so as to permit the insertion of the frame therein, whereupon it is revolubly held in place by a split ring 66, disposed between the said flange and the supporting surface of the frame 57. Interiorly the frame 63 is recessed as at 67 to receive the lens which is held in place by cement or other suitable means may be provided.

Markings 68 are provided on the under side of the frame 57 at the marginal portion, which show through a triangular opening 69 of the plate 22, which indicate the power of the particular lens which is in line with the openings 26 and 27 of the cover plates, a dot indicating the blank.

The frame 33 of the spherical auxiliary battery extends over opening 69, when two of its divisions are in position at the openings 26 and 27, so that triangular openings 71 and 72 are provided in the frame 33, so as not to obscure the reading of the main battery.

In order to properly position the lenses of the main battery, a bow spring 73 is keyed to the shaft 29, and is provided at its ends with bosses 74 and 75 which yieldingly engage recesses 76 radially in line with the axis of the opening 61, a washer 76 being disposed between the spring and the plate 23.

The lenses are all arranged so that their optic axes are at the same degree, as they are successively brought in line at the openings 26 and 27. The degree of astigmatism of the patient's eyes is first determined, and the pawl 54 is disengaged from the tooth wall 55, and is moved to the corresponding degree on the axes scale 56. The gear 48 is turned thereby, which causes the lenses 62 to be rotated correspondingly, so that the optic axes of all the lenses are simultaneously and correspondingly changed to agree with the degree of error of refraction of the patient, regardless of the power of the cylindrical lenses. Assuming the test is then started from the low power, and increased with the disk 33 placed at open. The various lenses of the cylindrical battery are successively brought before the patient's eye until the proper strength lens is found. The operation, however, may be reversed if it is desired to start from the higher powers and decrease the cylindrical foci.

For further tests beyond the range of the lenses 62, the plate 23 is provided with a lens holder 77, circumferentially arranged with respect to the opening 27, and provided with a spring 78, to permit other testing lenses to be inserted and held therein. An axis scale 79 is provided on the plate 23 above the holder 77.

The range of the spherical system A is up to 6. diopter, in quarters, in convex or concave, so that if greater power in convex is desired, the index of the disk 33 is placed at +6., which carries the power of the system A up to 12. d. For concave lenses the index is set at —6, signifying —6 diopter, while the system A is placed at +6 d., which neutralizes and gives zero. Then by decreasing the power of A, the power of the —6 is materially off-set so as to give all concave spherical lenses. After all of the power has been consumed, and nothing but the —6 remains, should still higher power be desired, the index is set at —12. It will be seen that the disk 33 may be utilized to increase the power of A beyond +6. d. or to give all of the concave spherical lenses, as well as to serve as a shut-out or opening as the case may be, for the whole instrument.

With my improvements, a very convenient device is provided eliminating the trial case in practically every refraction test of the eye, permitting the testing to be carried out in a quicker and more accurate manner, and with the combined apparatus A and B, auxiliary means is provided for transforming the optical values into sphere-cylindrical equivalents. The device is compact, automatic, simple in operation and construction, may be easily kept clean, and is practically dust proof.

I have illustrated preferred and satisfactory forms of my invention, but it is obvious that changes may be made therein within the spirit and scope thereof, as defined in the appended claims.

I claim:

1. In a device of the character described, a disk carrying a plurality of cylindrical lenses on a common axis, means rotatably supporting said lenses in said disk, means engaging said supporting means and adapted to simultaneously rotate the same by movement thereof to change the optic axes of said lenses, means adapted to be manually operated to impart direct movement to said last named means, and a scale adapted to indicate the amount of movement of said last named means.

2. In a device of the character described, a disk carrying a plurality of cylindrical lenses on a common axis, means rotatably supporting said lenses in said disk, means engaging said supporting means and adapted to simultaneously rotate the same by movement thereof to change the optic axes of said lenses, means adapted to be manually operated to impart movement to said last named means, and a scale in proximity to said manually operated means adapted to indicate the movement thereof and the amount of rotation of said lenses, said manually operated means acting as an index with respect to said scale.

3. In a device of the character described, a disk carrying a plurality of cylindrical lenses, on a common axis, means rotatably supporting said lenses in said disk, means engaging said supporting means, and adapted to simultaneously rotate the same by movement thereof to change the optic axes of said lenses, a handle mounted on said last named means for operating the same, and a scale adapted to indicate the amount of movement of said last named means.

4. In a device of the character described, a disk carrying a plurality of cylindrical lenses, on a common axis, means rotatably supporting said lenses in said disk, rotatable means engaging said supporting means, and adapted to simultaneously rotate the same by movement thereof to change the optic axes of said lenses, a handle mounted on said rotatable means for rotating the same, a scale adapted to indicate the amount of movement of said last named means, and means adapted to lock said handle and said last named means in any position of movement to maintain the position of the axes of said lenses.

5. In a device of the character described, a supporting plate provided with an arcuate slot therein, a disk concentric to the axis thereof, carrying a plurality of cylindrical lenses, on a common axis, means rotatably supporting said lenses in said disk, rotatable means concentric to the axis of said plate engaging said supporting means and adapted to simultaneously rotate the same by movement thereof to change the optic axes of said lenses, a handle mounted on said rotatable means and extending through said arcuate slot exterior of said plate, and a scale on said plate adapted to indicate the amount of movement of said handle and rotatable means.

6. In a device of the character described, a supporting plate provided with an arcuate slot therein, a disk concentric to the axis thereof, carrying a plurality of cylindrical lenses, on a common axis, means rotatably supporting said lenses in said disk, rotatable means concentric to the axis of said plate engaging said supporting means and adapted to simultaneously rotate the same by movement thereof to change the optic axes of said lenses, a handle mounted on said rotatable means and extending through said arcuate slot exterior of said plate, and a scale on said plate adapted to indicate the amount of movement of said handle and rotatable means, an arcuate locking member arranged in proximity to said slot and yieldable means on said handle adapted to engage said member in any position of movement to maintain the axes of said lenses.

7. In a device of the character described, a pair of spaced cover plates, provided with openings therein in alinement, a reading opening in one of said plates, a disk revolubly mounted between said plates carrying a plurality of cylindrical lenses on a common axis, said lenses adapted to be successively brought before said openings, markings on said disk to indicate the lenses in registration with said openings, and adapted to be read through said reading opening, means rotatably supporting said lenses in said disk, means adapted to simultaneously rotate said lenses to correspondingly change the optic axis of said lenses, means exterior of said plates for turning said last named means, and a scale of degrees of refraction adapted to determine the amount of movement of said exterior turning means.

8. In a device of the character described, a disk carrying a plurality of cylindrical lenses, on a common axis, means rotatably supporting said lenses in said disk, and provided with gear teeth, a gear rotatable with respect to said disk and engaging the gear teeth of said supporting means, an index handle for turning said gear, a scale of degrees of refraction adapted to determine the amount of movement of said gear, turning of said gear adapted to simultaneously rotate said lenses to correspondingly change the optic axis of said lenses.

9. An improved mounting for lenses, comprising in combination, a supporting member provided with an opening therein, a lens frame provided with a lens, and having a flange of greater dimensions than said opening at one side of said supporting member, a flange at the other side of said supporting member of less dimension than said opening, and a retaining ring having its outer dimensions greater than said opening, and its inner dimensions less than said last named flange, and disposed between said flange and the surface of said supporting member.

10. An improved mounting for lenses, comprising in combination a supporting member provided with a circular opening therein, a lens frame provided with a lens, and having a flange provided with gear teeth of greater diameter than said opening at one side of said supporting member, a flange at the other side of said supporting member of less diameter than said opening, and a retaining ring having an outer diameter greater than said opening and an inner diameter less than the diameter of said last named flange, and disposed between said flange and the surface of said supporting member, and a gear engaging said gear teeth and adapted to rotate said lens in said opening.

11. In a device of the character described, a pair of spaced cover plates provided with openings therein in alinement, a disk revolubly mounted between said plates, carrying a plurality of cylindrical lenses on a common axis, said lenses adapted to be successively brought before said openings, means rotatably supporting said lenses in said disk, means adapted to simultaneously rotate said lenses to correspondingly change the optic axis of said lenses, means exterior of said plate for turning said last named means, a spherical lens system, and an auxiliary battery of lenses rotatable on said common axis and adapted to be brought before said openings in combination with the lens of said spherical system, an index on said auxiliary battery extending exteriorly of said plates, and markings on one of said plates adapted to indicate by registration of said index therewith, the lens of said auxiliary battery in registration with said openings.

In testimony that I claim the foregoing as my invention, I have signed my name in presence of two subscribing witnesses.

MICHAEL WOOLF.

Witnesses:
D. LEWIS MATTERN,
MAE M. WINBERG.

Copies of this patent may be obtained for five cents each, by addressing the "Commissioner of Patents, Washington, D. C."